United States Patent [19]

Maglecic et al.

[11] 4,129,189

[45] Dec. 12, 1978

[54] WEIGHT CONTROL SYSTEM

[75] Inventors: Steve C. Maglecic, 620 Ash, Walla Walla, Wash. 99362; Larry W. Oberholtzer, Walla Walla, Wash.

[73] Assignee: Steve C. Maglecic, Walla Walla, Wash.

[21] Appl. No.: 684,255

[22] Filed: May 7, 1976

[51] Int. Cl.$^2$ .................... G01G 13/02; G01G 3/14
[52] U.S. Cl. ........................ 177/123; 177/1; 177/210 EM
[58] Field of Search ............ 177/50, 123, 210 EMF, 177/1, 122; 235/151.13, 151.33, 193

[56] References Cited

U.S. PATENT DOCUMENTS

| | | | |
|---|---|---|---|
| 3,175,632 | 3/1965 | Rouban | 177/123 X |
| 3,477,529 | 11/1969 | Burn et al. | 177/50 |
| 3,498,395 | 3/1970 | Henry | 177/1 |
| 3,670,833 | 6/1972 | Tomohiko et al. | 177/1 |
| 3,837,415 | 9/1974 | Connors et al. | 177/123 |
| 3,856,097 | 12/1974 | Bartlo et al. | 177/123 X |
| 3,938,601 | 2/1976 | Hobart | 177/123 X |
| 3,968,850 | 7/1976 | Gaskill | 177/185 X |

*Primary Examiner*—George H. Miller, Jr.
*Attorney, Agent, or Firm*—Dowrey & Cross

[57] ABSTRACT

The system controls the weights of individual charges of product or material accumulated by feeding material, preferably at a high "bulk" flow rate and then at a relatively low "dribble" flow rate, into one or more buckets or hoppers. As material is accumulated within each bucket, the system compensates against the effects of vibrational forces and flow rate and, upon termination of material accumulation, it corrects dribble time and final weight by respectively adjusting the bulk and dribble weights for the next charge, all with respect to an electronically established set weight corresponding to the desired weight of each charge. A linear voltage differential transformer (LVDT) senses the position of each bucket and provides electrical signals which are utilized by interface and control circuitry to control charge weight and provide an internal reference. The control system is particularly suited for use in combination with packaging systems.

26 Claims, 5 Drawing Figures

WEIGHT CONTROL SYSTEM

BACKGROUND OF THE INVENTION

This invention relates to systems for controlling the weights of individual charges of product or material including, but not limited to, powered or granular materials, liquids, slurrys, general solid material in divided form, and like food products, such as french fries, potato chips, shoestring potatoes, etc., for packaging into individual packages; however, the invention, in its broadest form, is suited for usage in other applications or environments, or in connection with the packaging of other types of materials than those specifically mentioned herein.

Weight control systems of this type basically adopt one of two approaches to control charge weight: one approach, often termed the "adjustable feed rate" approach, adjusts the feed rate at which material is accumulated; the other so-called "bulk-dribble" approach utilizes two feeders which operate at substantially constant feed rates, one feeder (termed the "bulk" feeder) operating at a high flow rate for rapidly bringing the charge almost to desired charge or "set" weight, the second feeder (termed the "dribble" feeder) operating at a low flow rate for accurately bringing the charge up to a set weight. In most practical applications, approximately 20-30 charges are formed and packaged per minute, charge rate depending upon charge material and the packaging and feeding apparatus employed. At these rates, however, present control systems, whether of the "adjustable feed rate" or "bulk-dribble" type, as the case may be, tend to drift, or lose accuracy for various reasons so that all charge weights obtained do not in fact correspond to a set weight but tend to fluctuate above and below set weight. Consequently, in order to maintain a given precentage of charges at weights in excess of a minimum acceptable weight (i.e., to prevent excessive numbers of underweight charges) set weight must exceed minimum acceptable weight by an amount sufficient to ensure that only a certain number of underweight charges will be produced, depending upon the shape of the distribution curve. Inasmuch as the typical distribution curve of percentage charges versus actual charge weights obtained with these systems is of low amplitude and wide band width with respect to set weight, however, they must be operated at set weights well above minimum acceptable weight. This technique results in substantial numbers of overweight charges and, hence, uneconomical product give-away.

It is desirable, therefore, to provide a weight control system which exhibits a more economical distribution curve and which, therefore, can be operated at set weights at or just above minimum acceptable weight with little or no product give-away. The "bulk-dribble" type of prior weight control system is more likely to exhibit such a distribution curve than the "adjustable feed rate" system because it maintains substantially constant feed rates in the bulk and dribble feeders and, for this reason, permits effective determination and control of undesirable effects which might go undetected, or be amplified by deliberate feed rate adjustment. Inasmuch as the bulk and dribble feeders operate at substantially constant feed rates, however, prior "bulk-dribble" systems yield charge accumulation times which may vary depending upon material flow conditions and other factors, with resultant uneconomical decline in accuracy of the charge weights obtained or idling of the packaging machine. Prior weight control systems of both the aforementioned types are uneconomical for still other reasons. Most are basically electromechanical in nature and typically employ servos for controlling charge weight in combination with external calibration weights for establishing set weight. In practical applications involving the charge accumulation rates mentioned previously, however, the servos cannot respond quickly enough to weight fluctuation, or tend to coast past set weight, while set weight, once established, cannot be adjusted readily for different charge weights, nor can it be calibrated with respect to actual system conditions. Prior weight control systems further are adversely affected by vibrational forces transmitted from vibrating material feeders, packaging machines etc., or by impact forces produced by material as it is dumped onto a scale or weigh cell, or by variations in material flow conditions.

SUMMARY OF THE INVENTION

This invention successfully overcomes these and other problems of prior weight control systems and yields an economical distribution curve of optimum amplitude and band width so that, using this invention, set weight now may be established at or just above minimum acceptable weight with little or no product give-away. The system maintains highly accurate change weights within a narrow weight range throughout repeated material accumulation cycles by establishing a set weight corresponding to the desired weight of successively accumulated charges, and then controlling charge weight during selected charge accumulations with respect to set weight on the basis of the present and at least one other charge accumulation, preferably the preceding charge accumulation.

According to one preferred embodiment of the invention especially suited for use with a so-called "bulk-dribble" weight control system, the control system of this invention compensates for the effects of vibrational forces and flow rate during each charge accumulation and further, upon termination of each charge accumulation, adjusts the bulk weight to be accumulated subsequently, preferably for the next charge, in relation to the time period required to accumulate the dribble weight, and adjusts the dribble weight to be accumulated subsequently, again preferably for the next charge, in relation to final or combined bulk and dribble static weight. A linear voltage differential transformer (LVDT) is operatively associated with and senses the position of each bucket and produces two alternating current output signals 180° out of phase which are converted into weight and reference signals. These signals are combined in ratio format at a set position of the LVDT corresponding to set weight while the reference signal or signals are further used to maintain system calibration.

Thus, it will be appreciated from the foregoing summary that the weight control system of this invention provides and maintains highly accurate control of the weights of successively accumulated individual material charges. The weight of each charge is controlled with respect to an electronically established set weight, without need for external calibration weights, both during and upon termination of charge accumulation. During charge accumulation, the system compensates against the effects of both vibration and flow rate, thereby accurately predicting the rate at which material is flowing into the bucket or material hopper in order to minimize or eliminate product overrun. For application to "bulk-dribble" systems, the weight control system of this invention further obtains optimum dribble feed times through appropriate adjustment of bulk weight while eliminating dynamic weighing errors by effecting final (e.g. combined bulk and dribble) weight correction under static loading conditions with the bucket or material hopper stationary. The weight control system further, when employed in combination with one or more LVDT's for sensing and indicating position, eliminates or minimizes systematic error and drift.

In most practical packaging applications, therefore, the weight control system of this invention will yield substantial economies by reducing product give-away. For example, in one specific application to controlling the weights of individual charges of french fries, the weight control system of this invention may be operated ecconomically at a set weight well below that of a corresponding adjustable feed rate control system and, hence, offers a substantial cost savings in terms of reduced product giveaway.

These and other features, objects and advantages of the present invention will become apparent in the detailed description and claims to follow taken in conjunction with the accompanying drawings in which:

DETAILED DESCRIPTION OF THE DRAWINGS

Figure 1:
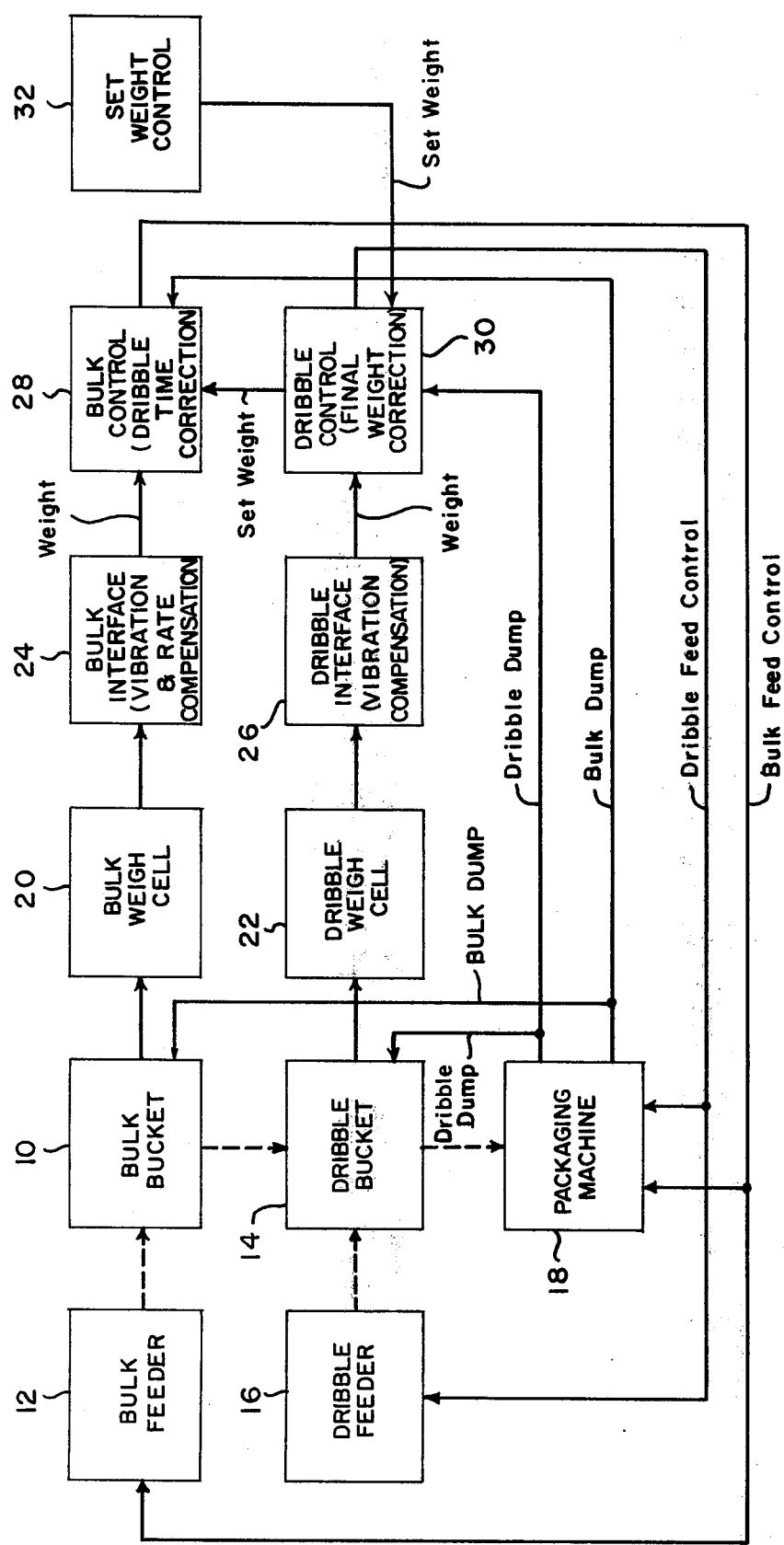
FIG. 1 is a schematic block diagram of a packaging system in combination with the weight control system of this invention.
Figure 2:
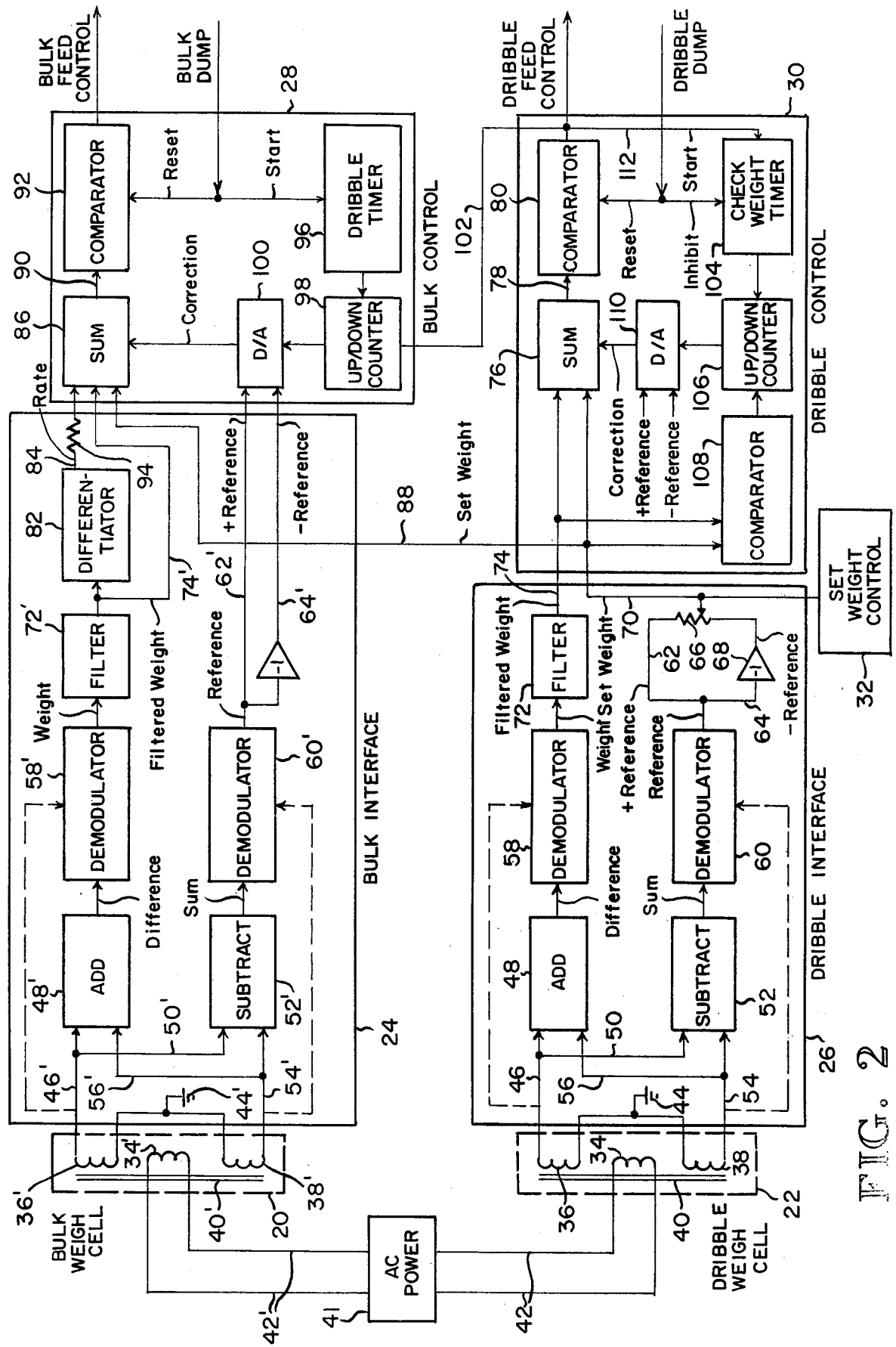
FIG. 2 is a schematic block diagram of the FIG. 1 weight control system in additional detail.

The weight control system of FIGS. 1 and 2 controls the weights of individual charges of product or material including but not limited to, powdered or granular materials, liquids, slurrys, general solid material in divided form, and like food products, such as french fries, potato chips, shoestring potatoes, etc. and is particularly suited for use in the successive accumulation of accurately weighted charges of such free flowing material for packaging into individual packages.

The FIG. 1 system provides an accurately weighted charge of free flowing material through the so-called "bulk-dribble" method, according to which nearly all (e.g. 80%) of the material is accumulated at a substantially constant maximum "bulk" flow rate, followed by continued material accumulation at a substantially constant minimum "dribble" rate until a pre-established set weight is obtained. (In the example, set weight corresponds to the desired weight of each charge.) In this way, it is possible to obtain economical charge accumulation times, as well as accurate charge weight. In the example of FIG. 1, further economical reduction in charge accumulation time is obtained by filling two buckets simultaneously, a bulk bucket 10 for receiving material from a relatively high flow rate bulk feeder 12 and a dribble bucket 14 for receiving material from a relatively low flow rate dribble feeder 16. (Material flow is depicted in broken lines and electrical signals are depicted in solid lines in FIG. 1). In the FIG. 1 system, the bulk bucket, when filled to desired bulk weight, discharges or dumps into the dribble bucket. While the now partially accumulated charge thus received in the dribble bucket is being brought up to set weight, the bulk bucket is simultaneously refilled with bulk weight for the next material charge. The dribble bucket, upon accumulation of set weight, then dumps or discharges the now formed charge to a cyclically operable packaging machine 18 for packaging into an individually packaged charge. While preferably the present invention is utilized with two feeders operated at different feed rates to obtain the above-described "bulk-dribble" material delivery to respectively associated bulk and dribble buckets, the invention could be utilized with a generally similar dual feeder system which delivers material to a single bucket or material hopper, or with a single feeder system which delivers material at one or multiple successively reduced feed rates to a single bucket or material hopper, or with a system in which a plurality of feeders, each operating at a different feed rate, deliver material to one or more buckets or material hoppers.

The weight control system of this invention controls charge weight with respect to the pre-established set weight during and upon termination of selected charge accumulations, preferably during and upon termination of each charge accumulation. The set weight is established electronically, without need for external calibration weights. During each charge accumulation, the system compensates against the effects of vibrational forces and variations in product flow rate simultaneously. That is, the weight control system of this invention provides both vibration and flow rate compensation during each charge accumulation. Vibration compensation substantially minimizes or eliminates vibratory or generally similar high frequency excitation influences, for example, vibrational forces produced by the surrounding environment, bucket oscillation, or material impact, as sources of charge weight error. As will be described presently with specific reference to FIG. 2, this invention implements vibration compensation electronically. Flow rate compensation substantially minimizes or eliminates product overrun or bucket overfill. More specifically, even though the bulk or dribble feeders are operated at substantially constant feed rates, material flow rate and, hence, the amount of material delivered to the bulk or dribble bucket, especially the bulk bucket, during each charge accumulation may vary, depending upon material flow conditions upstream of and in the feeders. Such variation in flow rate could cause the bulk or dribble buckets to fill nonuniformly or, most importantly, to overfill. It is possible, however, by determining flow rate, to compensate for the effects of flow rate by accurately predicting the amount of product which tends to coast past the feeders at shut off and, in this way, to cause the feeders to be shut off at an appropriate time before the bucket is filled to the desired weight, the weight of material still travelling to the intended bucket at feeder shut off being sufficient to complete the fill to the desired weight. Flow rate compensation also is implemented electronically.

This invention further provides weight control upon termination of selected charge accumulations, preferably each charge accumulation, so that the weights of charges to be accumulated subsequently are further controlled with respect to the pre-established set weight. In applications with the above described "bulk-dribble" feeding system for delivering material at substantially constant bulk and dribble flow rates to one or more buckets, the weight control system of this invention provides bulk weight correction to obtain optimum dribble feed time, and final weight correction to eliminate dynamic weighing errors. More specifically, the system adjusts the bulk weight to be accumulated subsequently, preferably in the next charge accumulation, in relation to the time period required to accumulate dribble weight in the immediately preceding or just formed charge and, in this way, controls dribble time. The system is, therefore, capable of maintaining a desired dribble time during repeated charge accumulations. In the FIG. 1 example, desired dribble time is selected and controlled in accordance with the packaging machine cycle time. In such applications, dribble time selected should be as long as possible to allow dribble flow to be relatively light; yet short enough that one charge accumulation is completed within each packaging cycle. Consequently, the dribble flow obtained provides an accurate final charge weight without allowing the packaging machine to idle due to lack of an available charge. Final weight correction is accomplished by adjusting dribble weight to be accumulated subsequently, again preferably in the next charge accumulation, in relation to the combined bulk and dribble weight (e.g. final weight) of the immediately preceding or just formed charge. The latter correction is accomplished under static loading conditions while the bucket is stationary and, in this way, dynamic weighing errors caused, for example, by residual bucket motion, or by mechanical or electrical lag time, are eliminated.

Referring now to FIG. 1 in particular, bulk and dribble weigh cells 20 and 22 respectively sense and produce electrical signals indicative of the position of buckets 10 and 14. The weigh cells 20 and 22 include bucket supporting spring means (see FIGS. 3 and 4) of known spring constant; therefore bucket position signals obtained indicate charge weight. These signals are delivered by respective bulk and dribble interface circuits 24 and 26 to bulk and dribble control circuits 28 and 30. A set weight control circuit 32 electronically establishes a set weight corresponding to desired charge weight and delivers a set weight signal to circuit 30 which in turn delivers the set weight signal to circuit 28. Upon accumulation of desired weight of material in the bulk, and then in the dribble buckets, circuit 28, and then circuit 30, deliver bulk and dribble feed control signals to feeder 12 and then to feeder 16, respectively, and thus cause them to shut off. As indicated, the packaging machine also receives the bulk and dribble feed control signals, in response to which it delivers a bulk dump signal and then a dribble dump signal to the bulk and dribble buckets, respectively. These signals cause the buckets to be dumped or discharged in the desired sequence and at the proper time in the packaging machine cycle. At the same time, the bulk and dribble dump signals are routed back to circuits 28 and 30, respectively, as part of controlling the weight of each charge upon termination of charge accumulation. As indicated parenthetically in the bulk and dribble interface and control circuit block representations of FIG. 1, the bulk interface circuit provides both vibration and flow rate compensation; the bulk control circuit provides dribble time correction; the dribble interface circuit provides vibration compensation only; and the dribble control circuit provides final weight correction.

Figure 4:
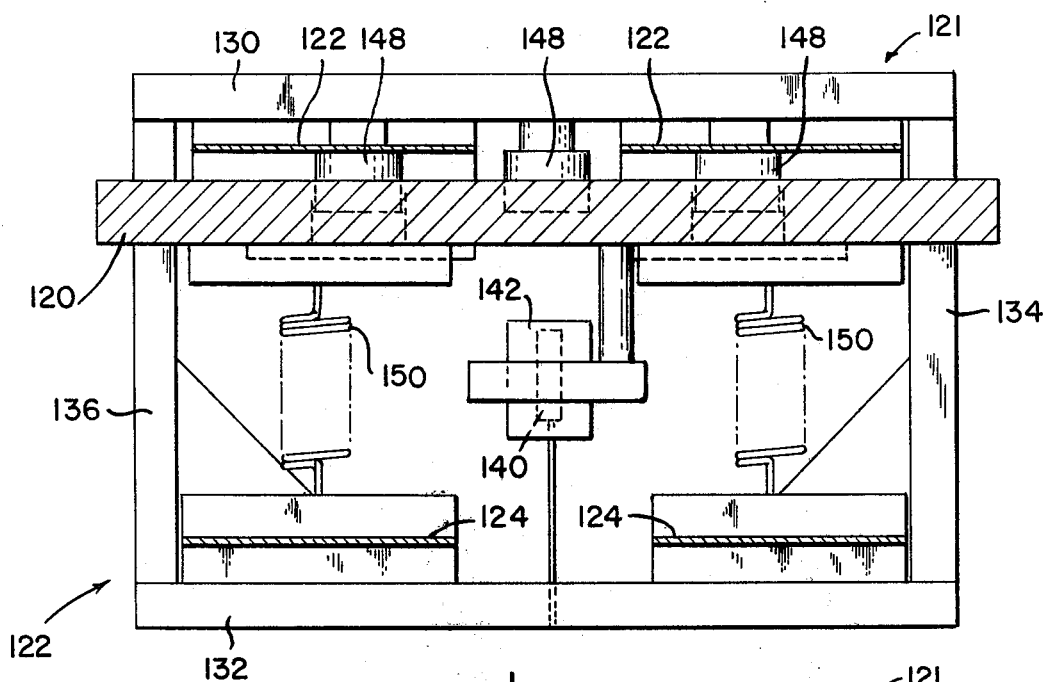
FIG. 4 is a section taken along line 4—4 of FIG. 3.
Figure 3:
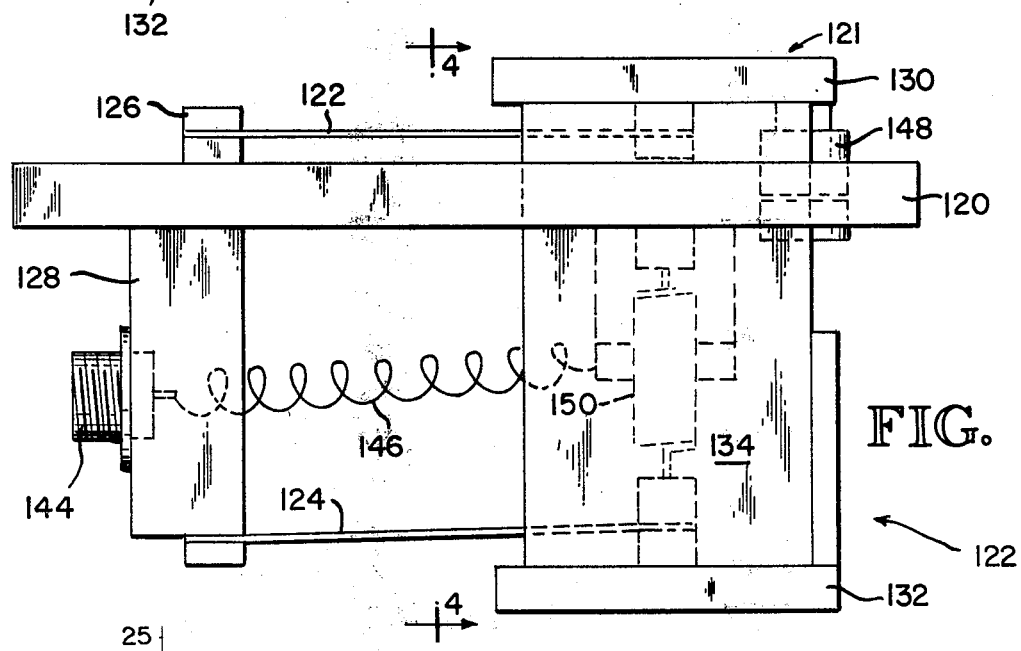
FIG. 3 is a side elevation of a weigh cell suited for usage in the FIG. 1 weight control system.

Referring now in particular to FIG. 2, the bulk and dribble weigh cells, bulk and dribble interface circuits, bulk and dribble control circuits, and set weight control circuit of FIG. 1 are illustrated in additional detail in schematic block diagram form, and are again referenced generally by the same reference numerals. Further details of the bulk and dribble weight cells are illustrated in FIGS. 3 and 4 to be described presently.

Referring first to the dribble weigh cell and interface circuit (generally referenced by numerals 22 and 26), the weigh cell 22 includes a linear voltage differential transformer (LVDT) made up of an excitation coil 34, two sensing coils 36 and 38, and a core 40 which is movable conjointly with the dribble bucket 14. An alternating current electrical power source 41 delivers alternating electrical current to coil 34 via lines 42. One side of each coil 36 and 38 is connected to a common ground 44. The other side of coil 36 is connected by line 46 to an addition circuit 48 and by branch line 50 to a subtraction circuit 52. Likewise, the other side of coil 38 is connected by line 54 to the subtraction circuit 52 and by branch line 56 to the addition circuit 48. Consequently, as the dribble bucket moves downward with increasing applied load during each charge accumulation, the core 40 will be moved correspondingly and, hence, the flux coupling between coil 34 and coils 36 and 38 will be altered such that the alternating current signal induced in coil 38 will increase while simultaneously therewith the alternating current signal induced in coil 36 will decrease — the two coil signals being 180° out of phase. The alternating current signals, therefore, which are presented to addition circuit 48 along lines 46 and 56 are 180° out of phase as are the signals presented to subtraction circuit 52 along lines 50 and 54. Consequently, the alternating current signal which appears at the output of add circuit 48 effectively constitutes a difference signal, whereas the alternating current signal which appears at the output of the subtraction circuit 52 effectively constitutes a sum signal. These signals are then delivered to and are converted into direct current by two demodulators, 58 and 60, respectively. The output of demodulator 58, therefore, constitutes a direct current weight signal, the amplitude of which varies in accordance with the position of core 40, whereas the direct current signal which appears at the output of demodulator 60 constitutes a reference signal, the amplitude of which remains substantially constant despite variation in position of core 40. Preferably, both demodulators are synchronized in phase with the LVDT output signals respectively present on lines 46 and 54, as depicted by the broken lines therebetween.

The direct current reference signal which appears at the output of the demodulator 60 is now transformed into positive and negative reference signals to provide a direct current set weight signal, depending upon the input setting by the set weight control circuit. (The positive and negative reference signals obtained also are utilized to maintain adjustment of the dribble control circuit, as will be described presently.) The reference signal is converted into positive and negative reference signals and thence into a direct current set weight signal by first routing it along parallel lines 62 and 64 which respectively terminate at opposite ends of a potentiometer 66. The reference signal which appears on line 62 constitutes the positive reference signal, whereas the reference signal which appears on line 64 is passed through an inverter 68 and, hence, constitutes the negative reference signal upon presentation at potentiometer 66. The set weight control input from set weight control circuit 32 establishes a potentiometer set point which represents a LVDT core position at which it is desired to obtain a comparison between set weight and accumulated charge weight, in the case of the dribble interface circuit, accumulated charge weight corresponding to final weight. More specifically, the set point of potentiometer 66 as determined by the set weight control circuit 32 represents a certain position of the dribble LVDT above, below, or at its null (center) position. Thus, since LVDT position is proportional to bucket position as determined by applied load, the set weight signal which appears on line 70 is proportional to bucket position. It will be recognized, of course, that the illustrated system permits the selection of a set point at any position along bidirectional travel of the LVDT, either above or below its null position, and that the negative reference signal could be eliminated if it were desired to define a set point over only one-half of total LVDT travel with respect to its null position.

The direct current signal which appears at the output of demodulator 58 constitutes a weight signal. The weight signal is delivered to a filter 72, the output of which constitutes a filtered weight signal and appears on line 74. Preferably, the filter time constant selected is longer than the time constant of the bucket and weigh cell so that bucket oscillation and bouncing, and material impact forces will be filtered out by filter 72 along with environmental, vibratory or like high frequency excitations.

The filtered weight and set weight signals thus obtained then are delivered to and summed by a summing circuit 76. The combined filtered and set weight signal produced by circuit 76 is then routed by line 78 to a comparator 80 in which the combined signal is compared to zero. As will be appreciated, the filtered and set weight signals are of opposite polarity. Consequently, their sum will approach zero as the dribble LVDT approaches the set position defined by potentiometer 66 and set weight control 32, as described previously. The comparator 80 will, therefore, produce an output signal which corresponds to the aforementioned dribble feed control signal when the set weight signal cancels out the filtered weight signal at the set position of the dribble LVDT. As will be appreciated, the aforementioned summation and comparison of the filtered and set weight signals effectively results in the combination of these signals in ratio format at the set position of dribble LVDT. Consequently, LVDT error factors such as temperature variation, material property changes, variation in excitation amplitude, variation in excitation frequency etc. are, in effect, cancelled out so that the only factor entering into the translation of bucket position into an electrical position signal indicative of charge weight is the electromechanical gain factor of the LVDT which, of course, is a fixed constant for any given LVDT, depending upon the physical characteristics thereof, and will change only if the LVDT is physically deformed. The end result is that the dribble interface circuit of FIG. 2 substantially minimizes or eliminates drift of other error factors which otherwise could originate in the dribble LVDT. In practical applications, the dribble interface circuitry depicted in FIG. 2, when interfaced with an industry standard LVDT, achieves better than 0.1% linearity in converting mechanical position to an electrical position signal. The drift of the set point defined by the set weight control also is so small as to be almost negligible. Therefore, the FIG. 2 dribble interface circuit exhibits prolonged high accuracy operation, with little or no maintainence or adjustment required.

The bulk interface circuit 24 of FIG. 2 is generally similar to the dribble interface circuit, except that the bulk interface circuit further provides flow rate compensation and does not include a potentiometer for independent set point definition of the bulk LVDT set point. Parts corresponding to those already illustrated and described with respect to dribble interface are, therefore, not further described herein and are designated by the same reference numerals, primed.

The bulk interface includes a differentiator 82 which receives and differentiates the filtered weight signal which appears at the output of the filter 72'. The signal which appears on line 84 at the output of the differentiator thus constitutes a rate signal indicative of the rate at which the position of the bulk bucket is changing with respect to time and thus, in most practical cases, the rate of flow of incoming material. The rate and filtered weight signals are delivered by lines 84 and 74' to a summing circuit 86, together with a set weight signal delivered by line 88 from the set weight control circuit 32 via the dribble interface potentiometer 66. The output of the summing circuit 86 is routed by line 90 to a comparator 92 which effects a comparison thereof with respect to zero. Again, the set weight signal which appears on line 88 at the input to the summing circuit is of opposite polarity to the rate and filtered weight signals and represents a set point along the course of travel of, in this case, the bulk LVDT at which it is desired to effect an electrical comparison between the filtered and set weight signals. The rate signal, however, modifies the point at which this comparison is effected because the rate signal is of the same polarity as the filtered weight signal. Consequently, as the bulk bucket is subjected to increasing incoming bulk material flow rates, the summing circuit will produce a zero output signal more quickly (or after a smaller bulk bucket displacement) and vice versa. The output of comparator 92 corresponds to the aforementioned bulk feed control signal and effectively combines the filtered weight signal, as modified by the rate signal, with the set weight signal in ratio format, as was the case of the dribble control comparator 80 described previosuly. To provide fine adjustment of rate signal with respect to the actual bulk feed rate of the bulk feeder, a variable resistor 94 may be included in line 84 for adjusting the rate signal prior to presentation thereof to the summing circuit 86.

Although the bulk interface circuit does not include a potentimoter; but instead obtains the set weight input signal via the dribble interface potentiometer, the bulk interface circuit could include a separate potentiometer located between lines 62' and 64' for effecting independent definition of a bulk LVDT set point. Likewise, the set points of the bulk and dribble LVDTs need not be identical and the set point of one or the other may represent a different physical position of the associated bucket. Referring again to the illustrated dribble interface circuit of FIG. 2, it also will now be apparent that it does not include a differentiator. The reason for this is that, in most practical applications of the weight control system to so-called "bulk-dribble" feeding systems, the dribble feed rate is so low that dribble flow rate fluctuations are of such small magnitude that they have little or no effect upon charge weight and, therefore, need not be compensated for. Furthermore, the final weight correction provided by the dribble control circuit, as will be described presently, effectively compensates for variations in dribble flow rate. In other applications involving higher dribble feed rates, of course, an appropriate differentiator circuit could be included in the dribble interface circuit.

Referring in particular to the bulk control circuit 28 of FIG. 2, a dribble timer 96, in combination with an up/down counter 98 and a digital-analog converter 100 constitute dribble time correction means operative upon initiation of dribble flow or in response to the bulk dump signal for adjusting bulk weight to be accumulated for the next material charge (i.e. the charge next to begin accumulation in the bulk bucket) in relation to the time period required to accumulate dribble weight of the charge now being completed in the dribble bucket (i.e. the charge just dumped into the dribble bucket from the bulk bucket). More specifically, the timer 96 is started upon receipt of the returning bulk dump signal which indicates that dribble flow has or is about to begin. The returning bulk dump signal also resets comparator 92. After a predetermined time period corresponding to desired dribble time, timer 96 delivers a clock pulse to the counter 98. The counter then determines whether or not a dribble feed control signal is then present at the output of the comparator 80 via line 102. If the dribble feeder is still running upon expiration of the desired dribble time as indicated by the absence of a dribble feed control signal, the counter counts up to increase bulk weight (i.e. decrease dribble time); if not, it counts down to decrease bulk weight (i.e. increase dribble time). The output of the counter thus constitutes an incremented or decremented correction signal which is delivered via converter 100 to a fourth input of the summing circuit 86. The correction signal will, therefore, serve to further modify the combination of the rate, filtered weight and set weight signals as described previously to effectively adjust the bulk weight of the next to be accumulated charge up or down, as the case may be.

In most practical cases, the counter 98 will count up one count, or down one count, upon termination of each filling cycle in which a dribble time correction is indicated. Each count represents an appropriate bulk weight increment, for example one ounce; however, the range of adjustment of the counter should be limited so that if the counter for some reason attempts to make a series of successive bulk weight corrections of excessive magnitude, it will reach the end of its operational counting range before disrupting the system. The magnitude of each incremented or decremented correction step also is selected so that the counter will increase or decrease the bulk weight to the desired level within a minimum number of filling cycles. Consequently, in the event of a dribble starving condition or failure of the dribble feeder, for example, the counter could be capable of adjusting bulk weight upward sufficiently until bulk weight equals set weight, thus not requiring any dribble flow at all. Appropriate indicators (not shown) may be provided to indicate the present condition of the counter to the operator or to a service technician. Additional controls (also not shown) may be provided to initially adjust, or readjust, the counter so that it operates about at the middle of its counting range. Further, the timer 96 could be started by other means responsive to initiation of dribble feeding.

In the example of FIG. 2, the set weight signal which is delivered by line 88 to the summing circuit 86 corresponds to a desired final weight (i.e. combined bulk and dribble weights). In this case, the bulk control counter 98 automatically offsets or compensates for the set weight signal so that the summing and comparator circuits 86 and 92 will produce the desired bulk feed control signal upon accumulation of bulk weight alone. That is, the counter effectively offsets a portion of the incoming set weight signal so that it appears to the summing and comparator circuits as indicating bulk weight.

Referring in particular to the dribble control circuit 30 of FIG. 2, the dribble control circuit includes a check weight timer 104, an up/down counter 106, a second comparator 108, and a digital-analog converter 110, all constituting final weight correction means, operative upon termination of dribble feeding or in response to the dribble feed control signal (refer again to FIG. 1), for adjusting dribble weight and, hence, final charge weight for the next material charge under static load conditions. Final charge weight is thus adjusted and controlled with respect to set weight without dynamic weighing errors or other weight measurement uncertainties. The check weight timer is initiated by a start signal which is routed by line 112 from comparator 80 and which corresponds to the dribble feed control signal. Thus, the dribble feed control signal indicates that dribble feeding to the dribble bucket has terminated. The timer 104 thereafter delivers a clock pulse to the counter 106 upon expiration of a time period sufficiently long that all dribble bucket motion has terminated. At this time, the second comparator 108 compares filtered weight, in this case corresponding to final charge weight, with set weight as represented by the signals respectively present in lines 74 and 70 and delivers a comparison signal to counter 106. The counter 106 counts up to increase dribble weight (i.e. increase final weight) if filtered weight is less than set weight, counts down to decrease dribble weight (i.e. decrease final weight) if filtered weight is greater than set weight, and does not count if filtered weight is equal to set weight. The incremented or decremented dribble correction signal which is thus presented at the third input of the summing circuit modifies the filtered and set weight signal inputs in a manner generally similar to that of the bulk control correction signal and summing circuit described previously. The counter 106 and convertor 110 also are generally similar to the bulk control counter and convertor, except that the counter 106, in most practical packaging applications, effects smaller incremental weight adjustments, for example in ¼-ounce increments. Further, timer 104 could be started by other means responsive to the termination of dribble feeding.

As indicated in FIG. 2, the dribble control circuit also receives a return dribble dump signal from the packaging machine (see also FIG. 1). This signal serves as a reset signal for the comparator 80, as well as an inhibit signal for the check weight timer in case the dribble bucket dumps before the check weight timer is initiated.

Referring now in particular to the bulk interface and control circuits of FIG. 2, the positive and negative reference signals generated by the bulk interface circuit are delivered along lines 62' and 64' to the bulk control convertor 100. These signals maintain calibration and adjustment of the convertor, and may be used to maintain calibration and adjustment of other elements of the bulk control circuit not shown. Likewise, the positive and negative reference signals produced by the dribble interface circuit are delivered by means not shown to the dribble control converter 110 and like components of the dribble control circuit to perform similar functions.

The FIG. 2 weigh cell, and interface and control circuits for both the bulk and dribble feeders, of course, could be adapted for use with a single bucket feed system. In this case, only one weigh cell and one interface are employed with two control circuits, one for each feeder. The interface circuit operates with both the bulk and dribble control circuits and the dribble timer 96 is started when bulk weight is accumulated (not at bulk dump). Likewise, the FIG. 2 circuitry could be adapted to a feed system including different numbers and arrangements of feeders.

One weigh cell suited for usage with this invention is illustrated in FIGS. 3 and 4. The weigh cell includes a spring supported scale platform in combination with a LVDT for sensing and providing electrical signals indicative of the position of the platform. The platform includes a stationary or fixed support plate 120 of generally square outline and a movable platform assembly 121 adapted for load bearing connection and conjoint movement with a bucket or material hopper. The platform assembly is supported from the base plate by two opposed pairs of upper and lower leaf springs 122 and 124, each pair mounted in parallel coplanar alignment at one end of the plate 120. The upper spring pair is mounted at one end (left end as illustrated) of the plate 120, as shown (FIG. 3). The lower spring pair is mounted by a vertical support 128 which depends from the underside of the plate 120 in vertical alignment with the point of attachment of the upper spring pair. The other ends of the springs respectively mount upper and lower generally horizontal platform members 130 and 132 of generally rectangular outlines, the upper member being adapted for load bearing connection with a bucket or material hopper. Two vertical side members 134 and 136 extend through slots not shown in plate 120 and interconnect the ends of members 130 and 132. The LVDT core 140 is mounted by the lower member 132 for vertical movement with respect to the LVDT sensing coils which are contained within a housing 142 mounted by the plate 120, as shown (FIG. 4). An electrical connector 144 (FIG. 3) is supported by the support 128 and is connected electrically with the LVDT by an appropriate electrical lead 146.

When subjected to a downward directed force, the platform assembly thus moves downward with respect to the stationary plate for a distance determined by the spring constant of the springs 122 and 124. The LVDT core will, therefore, move correspondingly in a downward direction with respect to the LVDT sensing coils to produce the above-mentioned output signals indicative of platform and, hence, bucket position. To further minimize vibration, one or more dashpots 148 may be mounted between plate 120 and member 130, or to supplement the force of springs 122 and 124, one or more extension springs 130 may be mounted between plate 120 and member 132, as shown. In retrofit or other applications, of course, the weight control system of this invention may be adapted for usage with existing weigh cell equipment and/or LVDT or equivalent position sensors, and in these applications, the FIGS. 3 and 4 weigh cell construction need not be utilized.

Figure 5:
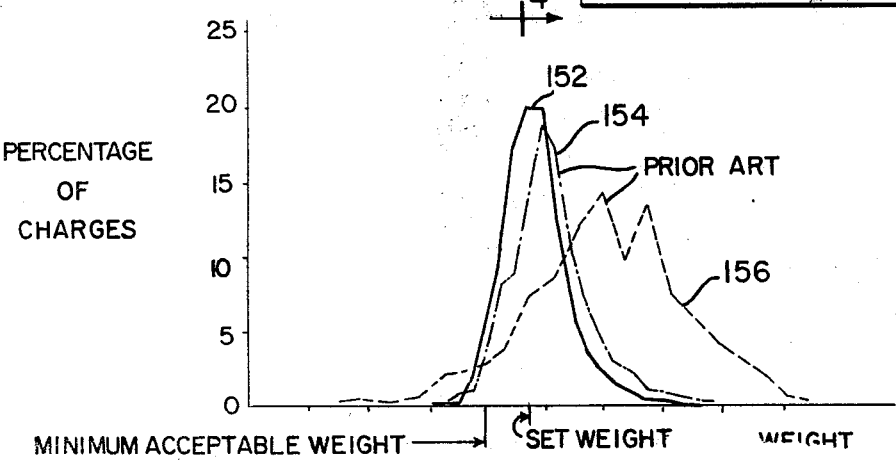
FIG. 5 is a distribution curve depicting operation of the FIG. 1 system and two prior art weight control systems.

As will now be appreciated from the foregoing, the preferred embodiment of this invention which is illustrated and described herein provides highly accurate charge weights throughout repeated charge accumulations with minimal product give-away, as depicted graphically by curve 152 in FIG. 5. Note particularly that curve 152 is of narrow band width and peaks with respect to set weight at or closely adjacent minimum acceptable weight, whereas prior art "adjustable feed rate" weight control systems of the servo-adjusted (curve 154) or manual (curve 156) type produce undesirable weight fluctuations and, therefore, must be set at weights substantially above minimum acceptable weights. Furthermore, the accuracy of the servor-adjusted system tends to deteriorate after repeated packaging cycles as the servos fall out of adjustment. Therefore, in many practical cases, without continual uneconomical manual adjustment, the servo-adjusted system soon begins to drift, and hence curve 154 soon approaches the shape of curve 156 with resultant increase in uneconomical product give-away.

The invention successfully overcomes these and other problems by controlling charge weight with respect to an electronically established set weight on the basis of the present and at least one other charge accumulation, preferably the preceding charge accumulation. That is, this invention continuously controls charge weight during each charge accumulation by compensating against the effects of vibrational forces and flow rate, and further periodically controls or updates charge weight upon termination of each charge accumulation by adjusting bulk and dribble weight for the next charge so as to respectively correct dribble time and final weight. It will be understood, of course, that although the bulk weight adjustment is effected upon termination of bulk weight accumulation in the bulk bucket and the dribble weight adjustment is effected upon termination of dribble weight accumulation in the dribble bucket in the system illustrated and described herein, these weight adjustments could be effected at other appropriate times prior to beginning the next charge accumulation. It will be further understood that, in those applications in which charge weight is controlled during each charge accumulation, the charge weight of the first formed charge is controlled, in part, on the basis of the initial settings of the bulk and dribble counters. These settings, of course, constitute arbitrary, midrange, or nominal corrections not derived from a preceding charge accumulation.

While the preferred embodiment of the invention has been illustrated and described herein, it should be understood that variations will be apparent to one of ordinary skill in the art. Accordingly, the invention is not to be limited to the specific embodiment illustrated and described herein, and the true scope and spirit of the invention are to be determined by referrence to the appended claims.

The embodiments of the invention in which an exclusive property or privilege is claimed are defined as follows:

1. A weight control system for a bulk-dribble packaging machine wherein individual charges of product are successively accumulated for packaging at a substantially constant bulk flow rate and, upon cessation of bulk flow, at a substantially constant dribble flow rate until a total charge weight approximating a desired set weight is accumulated, which system comprises: bulk weight adjusting means, responsive to the time taken during dribble flow to accumulate sufficient product to complete a charge, for controlling shut-off of bulk flow to increase or decrease the bulk weight of product accumulated for a subsequent charge at the bulk flow rate when dribble flow time was, respectively, greater or less than a predetermined period for the charge completed; and dribble weight adjusting means, responsive to the total static charge weight of product accumulated, for controlling shut-off of dribble flow to increase or decrease the dribble weight of product accumulated for a subsequent charge at the dribble flow rate when the total static charge weight of the charge completed was, respectively, less or greater than the desired set weight.

2. The system of claim 1, wherein said dribble weight adjusting means include means operable after termination of dribble flow under static loading conditions for determining whether the total charge weight of the charge completed was less or greater than desired set weight.

3. The system of claim 1, wherein said dribble weight adjusting means further include timer means responsive to termination of dribble flow for providing a timing signal upon expiration of a time period of sufficient duration subsequent to termination of dribble flow that the total charge weight of the charge completed is measurable under static loading conditions, and means responsive to said timing signal for comparing the total charge weight of the charge completed with desired set weight and changing dribble flow shut-off to change the dribble weight of product accumulated for a subsequent charge in a predetermined weight increment.

4. The system of claim 1, including interface means providing an operative connection between said bulk weight adjusting means together with said dribble weight adjusting means and movable product receptacle means, said interface means including means for adding two out-of-phase signals indicative of the position of said receptacle means to produce a weight signal, means for subtracting said two out-of-phase signals to produce a reference signal, means for filtering said weight signal to produce a filtered weight signal indicative of the weight of product in said receptacle means, and means for differentiating said filtered weight signal to produce a rate signal indicative of the rate of product accumulation in said receptacle means;

said bulk weight adjusting means including bulk flow control means responsive to said filtered weight and rate signals for controlling shut-off of bulk flow with respect to desired set weight, and dribble time correction means responsive to dribble flow time and calibrated by said reference signal for applying a correction signal to said bulk flow control means for causing it to adjust the bulk flow cut-off point of a subsequent charge to change bulk weight of product accumulated therefor by a predetermined weight increment;

said dribble weight adjusting means including dribble flow control means responsive to said filtered weight signal for controlling shut-off of dribble flow with respect to desired set weight, and final weight correction means operable a predetermined time after dribble flow shut-off that total charge weight of the charge completed represented by said filtered weight signal is measurable under static loading conditions and calibrated by said reference signal for applying a correction signal to said dribble flow control means for causing it to adjust the dribble flow cut-off point of a subsequent charge to change dribble weight of product accumulated therefor by a predetermined weight increment.

5. The system of claim 1, including interface means providing an operative connection between said dribble weight adjusting means and movable product receptacle means, said interface means including means for filtering a weight signal indicative of the position of said receptacle means signal to produce a filtered weight signal indicative of the weight of product in said receptacle means, said dribble weight adjusting means including means responsive to said filtered weight signal for controlling shut-off of dribble flow.

6. The system of claim 5, wherein said interface means further provide an operative connection between said bulk weight adjusting means and said receptacle means and include means for differentiating said filtered weight signal to produce a rate signal indicative of the rate of product accumulation in said receptacle means, said bulk weight adjusting means including means responsive to said filtered weight signal and said rate signal for controlling shut-off of bulk flow.

7. The system of claim 6, wherein said interface means still further include means for adding two out-of-phase signals indicative of the position of said receptacle means to produce a weight signal for presentation to said filtering means, and means for subtracting said two out-of-phase signals to produce a reference signal for presentation to said dribble weight adjusting means and said bulk weight adjusting means.

8. A method of controlling the weights of individual charges of product which are successively accumulated for packaging at a substantially constant bulk flow rate and, upon cessation of bulk flow, at a substantially constant dribble flow rate until a total charge weight approximating a desired set weight is accumulated, which method comprises the steps of: adjusting bulk weight in response to the time taken during dribble flow to accumulate sufficient product to complete a charge by controlling shut-off of bulk flow to increase or decrease the bulk weight of product accumulated for a subsequent charge when dribble flow time was, respectively, greater or less than a predetermined period for the charge completed; and adjusting dribble weight in response to the total static charge weight of product accumulated by controlling shut-off of dribble flow to increase or decrease the dribble weight of product accumulated for a subsequent charge when the total static charge weight of the charge completed was, respectively, less or greater than the desired set weight.

9. The method of claim 8, wherein said adjusting dribble weight step includes the additional step of comparing charge weight of product accumulated with desired set weight after termination of dribble flow under static loading conditions.

10. A system for controlling the weights of individual material charges, comprising:

means for establishing a set weight corresponding to the desired weight of successively accumulated charges;

control means for controlling (1) a bulk feeder adapted to feed material at a substantially constant bulk feed rate, and (2) a dribble feeder adapted to feed material at a substantially constant dribble feed rate, the bulk and dribble feeders delivering material to movable receptacle means for temporarily storing each charge, said control means including bulk control means responsive to the position of the receptacle means for first causing the bulk feeder to deposit a bulk weight of material less than said set weight into said receptacle means, and dribble control means responsive to the position of said receptacle means for then causing said dribble feeder to deposit sufficient additional dribble weight of material into said receptacle means that the combined bulk and dribble weights equal said set weight, said bulk control means including dribble correction means for adjusting the bulk weight to be accumulated subsequently in said receptacle means in relation to the time period required to accumulate said dribble weight, said dribble control means including final weight correction means for adjusting the dribble weight to be accumulated subsequently in said receptacle means in relation to the combined bulk and dribble weights; and interface means operatively associated with said control means and said receptacle means for providing a direct current electrical signal proportional to the position of said receptacle means to indicate the weight of material therein, means for filtering said signal to produce a filtered weight signal, and means for differentiating said filtered weight signal to produce a rate signal.

11. The system of claim 10, wherein said dribble correction means include means for causing the bulk weight to change incrementally until the dribble time period equals a desired time period.

12. The system of claim 10, wherein said bulk control means further comprise means for modifying said rate signal in relation to bulk rate.

13. The system of claim 10, wherein said final weight correction means include means for causing the dribble weight to change incrementally until the combined bulk and dribble weight equals said set weight.

14. The system of claim 10, wherein said bulk control means further comprise bulk actuator means responsive to said filtered weight signal and said rate signal for controlling the bulk feeder such that bulk weight is sufficient to provide operation of the dribble feeder for a desired time period.

15. The system of claim 14, wherein said dribble correction means include timer means responsive to initiation of operation of the dribble feeder for providing a timing signal upon expiration of said desired dribble time period, and weight adjustment means responsive to said timing signal for causing said bulk actuator means to change bulk weight incrementally until dribble time equals the desired time period.

16. The system of claim 15, wherein said weight adjustment means are further operative to provide a limited range of incremented and decremented weight corrections.

17. The system of claim 10, wherein said dribble control means further comprise dribble actuator means responsive to said filtered weight signal for controlling the dribble feeder such that the combined bulk and dribble weight equals said set weight.

18. The system of claim 17, wherein said final weight correction means include timer means responsive to termination of dribble feeding for providing a timing signal upon expiration of a time period of sufficient duration subsequent to termination of operation of the dribble feeder that said receptacle means are stationary, and weight adjustment means responsive to said timing signal for causing said dribble actuator means to change dribble weight incrementally until the combined bulk and dribble weight equals said set weight.

19. The system of claim 18, wherein said weight correction means are further operative to provide a limited range of incremented and decremented weight corrections.

20. A system for controlling the weights of individual material charges, comprising: p1 means for establishing a set weight corresponding to the desired weight of successively accumulated charges;

control means for controlling (1) a bulk feeder adapted to feed material at a substantially constant bulk feed rate, and (2) a dribble feeder adapted to feed material at a substantially constant dribble feed rate, the bulk and dribble feeders delivering material to movable receptacle means for temporarily storing each charge, said control means including bulk control means responsive to the position of the receptacle means for first causing the bulk feeder to deposit a bulk weight of material less than said set weight into said receptacle means, and dribble control means responsive to the position of said receptacle means for then causing said dribble feeder to deposit sufficient additional dribble weight of material into said receptacle means that the combined bulk and dribble weights equal said set weight, said bulk control means including dribble correction means for adjusting the bulk weight to be accumulated subsequently in said receptacle means in relation to the time period required to accumlate said dribble weight, said dribble control means including final weight correction means for adjusting the dribble weight to be accumulated subsequently in said receptacle means in relation to the combined bulk and dribble weights;

sensing means operatively associated with said receptacle means for sensing the position of said receptacle means and simultaneaously providing two alternating current signals 180° out of phase; and interface means operatively interconnecting said sensing means and said bulk and dribble control means, said interface means including means for adding said signals to produce a weight signal, and means for subtracting said signals to produce a reference signal.

21. The system of claim 20, wherein said bulk and dribble control means each include means for combining said weight and reference signals and producing a signal proportional to the position of said receptacle means.

22. The system of claim 20, wherein said sensing means include a linear variable differential transformer.

23. The system of claim 20, wherein said interface means include first and second demodulator means respectively synchronized with said alternating control signals for receiving and demodulating said weight and reference signals, respectively.

24. The system of claim 20, wherein said interface means further include means for receiving said reference signal and providing (1) a direct current positive reference signal and (2) a direct current negative reference signal.

25. The system of claim 24, wherein said means for establishing a set weight include means for receiving said positive and negative reference signals and producing a set weight signal indicative of a predetermined position of said receptacle means corresponding to said set weight.

26. A system for controlling the weights of individual material charges, comprising:

means for establishing a set weight corresponding to the desired weight of successively accumulated charges;

control means for controlling (1) a bulk feeder adapted to feed material at a substantially constant bulk feed rate, and (2) a dribble feeder adapted to feed material at a substantially constant dribble feed rate, the bulk and dribble feeders respectively delivering material to movable bulk and dribble receptacle means for temporarily storing each charge, said control means including bulk control means responsive to the position of the receptacle means for first causing the bulk feeder to deposit a bulk weight of material less than said set weight into said receptacle means, and dribble control means responsive to the position of said receptacle means for then causing said dribble feeder to deposit sufficient additional dribble weight of material into said receptacle means that the combined bulk and dribble weights equal said set weight, said bulk control means including dribble correction means for adjusting the bulk weight to be accumulated subsequently in said receptacle means in relation to the time period required to accumulate said dribble weight, said dribble control means including final weight correction means for adjusting the dribble weight to be accumulated subsequently in said receptacle means in relation to the combined bulk and dribble weights;

two linear variable differential transformers respectively operatively connected with said bulk and dribble receptacle means, each transformer providing two alternating current signals 180° out of phase; and two interface means respectively operatively interconnecting said transformers and said bulk and dribble control means, each interface means including means for adding the respective signals to produce a weight signal, and means for subtracting the respective signals to produce a reference signal, and wherein said bulk and dribble control means each include means for combining said weight and reference signals and producing a signal proportional to the position of the respective receptacle means.

* * * * *

UNITED STATES PATENT AND TRADEMARK OFFICE
CERTIFICATE OF CORRECTION

PATENT NO. : 4,129,189
DATED : December 12, 1978
INVENTOR(S) : Steve C. Maglecic and Larry W. Oberholtzer It is certified that error appears in the above-identified patent and that said Letters Patent are hereby corrected as shown below:

Column 1, line 47, delete "however".

Column 2, line 1, "Prior weight" begins a new paragraph.

Column 11, line 58, change "130" to --150--.

Claim 20, line 2, delete "p1"; "means for" begins a new paragraph.

Claim 23, line 3, change "control" to --current--.

Signed and Sealed this

Seventh Day of August 1979

[SEAL]

Attest:

Attesting Officer

LUTRELLE F. PARKER
*Acting Commissioner of Patents and Trademarks*